Patented June 7, 1938

2,119,873

UNITED STATES PATENT OFFICE 2,119,873

HALOGENATED HYDROCARBON SOLVENTS

Peter J. Wiezevich, now by judicial change of name Peter J. Gaylor, Elizabeth, and Hans G. Vesterdal, Linden, N. J., assignors to Standard Oil Development Company, a corporation of Delaware No Drawing. Application December 4, 1936, Serial No. 114,132

6 Claims. (Cl. 260—162)

This invention relates to the halogenation of low boiling liquid petroleum hydrocarbons, and more specifically, it deals with the production of non-inflammable chlorinated solvents of high volatility with high yields.

Numerous processes have been disclosed in the literature on the halogenation of various hydrocarbons. So far, none of the products of direct chlorination of petroleum compounds have met with any degree of success. Some of the reasons for this situation are that the yields of low boiling non-inflammable products are generally low, their stability towards hydrolysis are generally poor, and the methods employed for the preparation of the products are too expensive. Furthermore, no large outlet for such specific materials has been developed.

One object of this invention is to produce relatively stable low boiling, non-inflammable, halogenated hydrocarbons at a low cost in high yields. Another object of the invention is to prepare outside coating compositions containing such halogenated hydrocarbon solvents, thereby providing a large outlet for such products. Other objects will become apparent from the subsequent discussion.

According to the present invention, low boiling liquid hydrocarbons, as for example, those boiling between 30–250° F. are halogenated with chlorine or bromine, at 50–180° F. If fluorine is to be employed as a halogenating agent, the preferred temperature is in the neighborhood of 0 to −100° F. The chlorination is preferably carried out in glass vessels in the absence of metals of the iron group (Fe, Co, and Ni). Good dispersion of the chlorine is obtained by forcing the gaseous reagent through a porous thimble, fritted glass or other porous material. A reflux condenser is provided on the reactor so that low boiling materials may be returned to the reaction zone. The presence of light is desirable although chlorination in the dark with catalysts may be carried out effectively.

It has been found that if chlorination is carried out beyond 40%, large amounts of high boiling products are obtained which are not as useful for solvent purposes as the lower boiling materials. Hence, in the preparation of low boiling solvents, it is desirable to halogenate to a chlorine content of about 20–40% after the chlorination, some (10–30%) low boiling material (boiling from 100 to about 260 or 270 or even 285° F.) is present which does not contain sufficient chlorine to be non-inflammable. This fraction is distilled from the product and returned to the chlorination chamber, alone, or with additional fresh hydrocarbon feed stock. A second fraction is distilled off boiling between 265 or 275 or 290° F. to 345 or 375 or even 410° F. This product has a specific gravity of 0.964 to 1.167, is non-inflammable, and is suitable as a solvent for fats, dewaxing, coating compositions, etc. The residue amounting to 1–10% is highly chlorinated and may be used for some special purposes, e. g. impregnation of fibrous materials for fireproofing, etc. In such a case it is preferable to decolorize the material by contacting with clay or charcoal.

It has been further found that the chlorinated hydrocarbons may be stabilized against decomposition by steam distillation, especially in the presence of an alkali such as sodium carbonate or sodium hydroxide. They may be stabilized also by the addition of 0.01–1% of cracking coal tar, cracked naphtha of the same boiling range as the chlorinated product, etc.

In cases wherein unsaturated hydrocarbons are present, it is often advantageous to remove such materials prior to chlorination. For instance, in the case of stabilizer bottoms which generally contains about 35% unsaturates, it has been found that a different type of product is obtained when the hydrocarbon mixture is treated with 15–25% by volume of concentrated sulfuric acid. The addition of 10% boron fluoride or aluminum chloride at 10–100 atmospheres pressure and 100–350° F. causes polymerization of the unsaturates. The thus treated distillate is best distilled to 250 –300° F. before chlorination, and thus is carried out on the overhead fraction.

Other raw materials which may be chlorinated by this process are hydrogenated or "hydroformed" naphthas, olefine polymers, such as the polymers obtained by thermal polymerization of $C_2$–$C_5$ olefines with or without catalysts such as phosphoric acid, clays, etc., aromatic naphthas, such as $SO_2$ extracts of Conroe naphtha, straight run gasoline, cracked gasoline, naphthenic gasoline, coal tar fractions, reformed gasoline, debutanizer bottoms, etc.

For certain purposes, as for non-inflammable impregnating compositions, it is advantageous to chlorinate certain high boiling hydrocarbons, such as solvent extracts (Edeleanu, phenol, chlorethyl ether, furfural, nitrobenzene, etc.), boiling substantially between 320 to 450° F. In such a case it is preferable to chlorinate at 60–70° F. to about 35–40% chlorine. Since the heavier solvent extract fraction tends to produce coke during chlorination, it is preferable to distill off about 50% and chlorinate the low boiling distillate boiling between about 300–360° F.

The following examples illustrate the various features involved in the present invention:

Example 1

A sample of stabilizer bottoms containing 67% pentanes and pentenes, 26% hexanes and hexenes, and 7% boiling in the heptane range, and having a total unsaturated content of about 35% was chlorinated according to the present invention at 150° F. to a chlorine content of 38.5% (Sp. Gr. 1.090). The product was distilled into the following fractions which were shaken with caustic to neutralize any acidity, and burning tests were carried out to determine their inflammability:

| Fraction ° F. | Percent of total | Sp. Gr. | Burning test |
|---|---|---|---|
| 1......... 104–230 | 3.7 | ...... | Yes |
| 2......... 230–272 | 17.3 | 0.916 | Yes |
| 3......... 272–292 | 18.7 | 0.985 | Barely |
| 4......... 292–320 | 17.3 | 1.056 | No |
| 5......... 320–374 | 31.1 | 1.167 | No |

Combined fractions 3–5 after neutralization had a Kauri-butanol solvency value of 76.4. After steam distillation in presence of caustic the value dropped somewhat to 75.4.

"Yes" in the burning test means that the sample will flash when a lighted match is passed over the surface on a glass plate.

In the above case, fractions 1 and 2 were rechlorinated to give an additional 15% of non-burning solvent.

Example 2

A sample of stabilizer bottoms used in Example 1 was treated with 20% by volume of concentrated sulfuric acid prior to chlorination in diffused daylight. The thus treated water-washed sample was then chlorinated as in Example 1 and the product distilled, the fractions washed with alkali, giving the following data:

| Fraction ° F. | Percent of total | Sp. Gr. | Burning test |
|---|---|---|---|
| 1......... To 230 | 0 | ...... | ...... |
| 2......... 230–278 | 6.7 | ...... | Yes |
| 3......... 278–320 | 37.3 | 1.0137 | No |
| 4......... 320–374 | 42.7 | 1.0827 | No |
| 5......... 374–410 | 12.0 | 1.1626 | No |
| Residue and loss | 1.3 | | |

Fraction No. 3 had a Kauri-butanol solvency of 73.9. Its instability (as determined by refluxing 10 cc. of the fraction with 25 cc. of water for 2 hours and titrating acidity with 0.1 N Caustic) was 496 cc. NaOH. After steam distillation with caustic, the stability of the sample was improved, showing an instability value of 460.

Fraction No. 2 can be rechlorinated by adding it to the feed stock in a continuous process.

Example 3

A sample of hydrogenated naphtha boiling between 176–212° F. and having a Kauri-butanol solvency of 57.9 was chlorinated in a glass vessel at 185° F. according to the present invention to a chlorine concentration of 20%. The product was distilled into fractions which were neutralized. It is essential that no iron or iron group metals be present during the distillation. The following data were obtained:

| Fraction ° F. | Percent of total | Sp. Gr. | Burning test | Color |
|---|---|---|---|---|
| 1......... 158–230 | 15 | 0.8270 | Yes | Water White |
| 2......... 230–284 | 22 | 0.8808 | Yes | Do. |
| 3......... 284–338 | 30.6 | 0.9643 | No | Green |
| 4......... 338–345 | 23 | 1.0846 | No | Brown |
| 5......... Residue | 9.4 | | | Black |

The color of the distillates is considerably reduced by the alkali wash. After this treatment, the Kauri-butanol solvency of fraction No. 3 was 76.7. This was somewhat improved to 77.4 by refluxing the distillate over aqueous caustic. The latter product had an instability value of 385.

Example 4

A sample of Edeleanu extract boiling between 340–430° F. was chlorinated at 60–70° F. to 39% chlorine, according to the present invention. A fraction boiling between 300–350° F. at 2 mm. pressure was distilled off, which after alkali washing had a remarkably low instability value of 65. The material was also noninflammable.

Example 5

An SO₂ extract, 90% of which boils at 320–505° F. was chlorinated at 60–70° F. according to this invention to a chlorine content of 32% chlorine.

After washing the product with aqueous alkali, only 68% could be distilled over at 2–3 mm. pressure up to 410° F. The heaviest fractions are thick, viscous, yellow-colored oils which have a high stability and which are suitable as lubricants, addition agents to lubricants, impregnation agents for imparting non-inflammability to fibrous or porous material, addition agents to coating compositions, etc.

The residue may be percolated through clay and used as a resin for uses generally attributed to resins.

Example 6

A fraction of stabilizer bottoms boiling up to 70° C. was treated with boron fluoride at −80° C., and a viscous mass which separated out was removed. The residue was then chlorinated according to this invention in a glass vessel to a specific gravity of 1.024 (35% chlorine). This product was neutralized and washed immediately after chlorination. Upon standing several days in the sunlight, only a slight discoloration was observed. The product was fractionated in the absence of iron metals giving the following results:

| Fraction °F. | Percent of total | Sp. Gr. | Burning test |
|---|---|---|---|
| 1......... 104–230 | 14.5 | .8060 | Yes |
| 2......... 230–275 | 24.5 | .9194 | Yes |
| 3......... 275–320 | 28.5 | 1.028 | No |
| 4......... 320–374 | 20.5 | 1.100 | No |
| 5......... 374–410 | 6.7 | | No |
| Residue and loss | 5.3 | | |

Fractions 1 and 2 were recirculated to the next batch for rechlorination, while fractions 3, 4 and 5, representing about 56% of the total feed, were combined and employed as a solvent for an outside coating paint described in the co-pending application of Baldeschwieler and Wiezevich, Serial No. 96,782.

Example 7

A sample of SO$_2$ petroleum extract was fractionated to the 50% point, obtaining an overhead product boiling between 340–430° F. This latter material was chlorinated at 60–70° F. according to the present invention up to 39% chlorine. On distillation and chilling, some white crystalline material separated out which was purified by crystallization from 55° naphtha solution. This product melted at 324–380° F. and was found suitable for the impregnation of fibrous materials, for fireproofing purposes, as an addition agent for lubricants, as an ingredient in coating compositions and plastics, etc.

The overhead chlorinated liquid product from this process was non-inflammable and had solvent properties for wax, rubber, resins, and served as a suitable plasticizer.

Example 8

A 400–445° F. fraction of SO$_2$ extract of petroleum was chlorinated according to the present invention to 39% chlorine. The product was steam and vacuum distilled to yield 93% of a heavy non-inflammable oil suitable for fireproofing and plasticizing purposes.

Example 9

The first 28% distillate of an SO$_2$ petroleum extract (latter boiling at 320–400° F.) was chlorinated according to the present invention to a chlorine content of 33%. By diluting the product with naphtha and chilling to −10° C., a mass of crystals were precipitated which on recrystallization from naphtha separated out as white flakes. These crystals were redissolved in naphtha and used to impregnate some paper therewith. The impregnated paper would not even burn in a gas flame, showing its suitability for building and other materials.

The liquid chlorinated product recovered from this process was an excellent solvent for resins.

As brought out previously, the lower boiling liquid non-inflammable hydrocarbons produced by this invention are excellent solvents for outdoor paints, brick or concrete coating compositions, etc. They may also be employed for dewaxing, fat extraction as well as extraction of other organic materials such as insecticides, etc., solvents for waxy resins, rubbers, plastics, oils, etc.

These solvents may be used as such or in admixture with 10–50% of carbon tetrachloride, trichlorethylene, dichlorethane, acetone, Stoddard solvent, benzol, chlorbenzenes, chlornaphthalenes, chlor-diphenyls, asphalt, tars, etc.

This invention is not limited by any examples or by theories as to operation since it is apparent that wide variations from the above examples can be used without departing from the primary scope of the invention, but it is intended to claim all inherent novelty by the following claims.

We claim:

1. Process for producing halogenated hydrocarbons of improved solvent power comprising chlorinating at 50–180° F. in the absence of metals of the iron group, a mixture of petroleum hydrocarbons boiling between 30–450° F. to a chlorine content of 20–40%, fractionating the product in the absence of metals of the iron group and without substantial decomposition, removing the fraction boiling up to about 285° F., returning it to the chlorinating chamber for further chlorination, removing the fraction boiling between 285° F. to 410° F., and washing said fraction with alkali.

2. Process according to claim 1 in which the first fraction removed boils up to 260° F.

3. Process according to claim 1 in which the mixture of petroleum hydrocarbons chlorinated boils between 30–250° F.

4. Process according to claim 1 in which the second fraction removed is steam distilled in presence of alkali.

5. Process according to claim 1 in which the chlorination is conducted in a glass vessel.

6. A non-inflammable halogenated hydrocarbon mixture having a boiling range substantially from 100° F. to 375° F., a Kauri-butanol solvency value above 70, and a specific gravity at 60° F. of 0.964 to 1.167.

PETER J. WIEZEVICH.
HANS G. VESTERDAL.